United States Patent [19]

Furuhama et al.

[11] Patent Number: 5,784,893
[45] Date of Patent: Jul. 28, 1998

[54] AIR CONDITIONING SYSTEM WITH BUILT-IN INTERMEDIATE HEAT EXCHANGER WITH TWO DIFFERENT TYPES OF REFRIGERANTS CIRCULATED

[75] Inventors: Kokichi Furuhama, Tokyo; Tetsuo Sano, Shizuoka-ken; Masao Ozu, Kanagawa-ken, all of Japan

[73] Assignee: Kabushiki Kaisha Toshiba, Kawasaki, Japan

[21] Appl. No.: 835,639

[22] Filed: Apr. 10, 1997

Related U.S. Application Data

[63] Continuation of Ser. No. 400,879, Mar. 8, 1995, abandoned.

[30] Foreign Application Priority Data

Mar. 30, 1994 [JP] Japan ................... 6-061632

[51] Int. Cl.$^6$ ................... F25D 17/06
[52] U.S. Cl. ................... 62/333; 62/434
[58] Field of Search ................... 62/434, 435, 332, 62/333

[56] References Cited

U.S. PATENT DOCUMENTS

| | | | |
|---|---|---|---|
| 3,127,929 | 4/1964 | Ringquist | 62/435 X |
| 3,216,215 | 11/1965 | Schuett | 62/435 X |
| 3,237,415 | 3/1966 | Newton | 62/435 X |
| 4,000,626 | 1/1977 | Webber | 62/175 |
| 4,344,296 | 8/1982 | Staples et al. | 62/175 |
| 4,753,080 | 6/1988 | Jones et al. | 62/435 X |
| 5,042,262 | 8/1991 | Gyger et al. | 62/64 |
| 5,207,077 | 5/1993 | Rademacher et al. | 62/502 |
| 5,265,437 | 11/1993 | Saperstein et al. | 62/435 X |
| 5,272,878 | 12/1993 | Schechtig | 60/655 |
| 5,320,166 | 6/1994 | Swenson | 62/435 X |

FOREIGN PATENT DOCUMENTS

| | | |
|---|---|---|
| 0 516 093 A1 | 12/1992 | European Pat. Off. . |
| 2 296 829 | 7/1976 | France . |
| 2 514 875 | 4/1983 | France . |
| 2 692 343 | 12/1993 | France . |
| WO 92/18580 | 10/1992 | WIPO . |

*Primary Examiner*—William E. Tapolcai
*Attorney, Agent, or Firm*—Foley & Lardner

[57] ABSTRACT

An air conditioning system in which each alternative refrigerant can be fully utilized so as to present as much as actual COP in comparison with the conventional HCFC22 and to achieve safe use as operating refrigerants. The air conditioning system includes: a first refrigerant circuit in which a first refrigerant circulates, the first refrigerant circuit including: an indoor heat exchanger; and a fluid drive unit, connected to the indoor heat exchanger by way of a first piping, which drives the first refrigerant; a second refrigerant circuit in which a second refrigerant circulates, the second refrigerant circuit including: a compressor which compresses the second refrigerant; an expansion valve, connected to the compression means, for expanding the second refrigerant; and an outdoor heat exchanger connected to the compressor and the expansion valve by way of a second piping; and an intermediate heat exchanger for heat-exchanging between the first refrigerant in the first refrigerant circuit and the second refrigerant in the second refrigerant circuit.

20 Claims, 8 Drawing Sheets

| REFRIGERANT | PRESSURE LOSS VALUE [kPa] |
|---|---|
| HFC32/125 (50/50) | 12.1 |
| HFC32/125 (25/75) | 15.7 |
| HFC125 | 22.1 |
| HFC23 | 8.3 |
| $CO_2$ | 3.9 |
| HFC32/134a (25/75) | 20.2 |
| HFC134a | 29.3 |

(Connecting pipe portion being each 10m under 5°C saturated vapor)

FIG.8

| REFRIGERANT | THEORETICAL COP |
|---|---|
| HFC134a | 5.52 |
| HFC32/125 (75/25) | 5.07 |
| HFC32 | 5.33 |
| AMMONIA | 5.71 |
| PROPANE | 5.37 |
| HFC32/134a (10/90) | 5.48 |
| HFC32/125 (50/50) | 4.92 |

(Evaporation temperature at 5°C condensation temperature at 45°C)

FIG.9

| | HCFC22 | HFC134a | HFC32/125 (50/50) | Present Invention |
|---|---|---|---|---|
| COP calculated based only on thermal property | 5.86 (100%) | 5.86 (100%) | 5.18 (88%) | |
| COP calculated with 10m connecting pressure loss being added thereto | 5.48 (100%) | 4.26 (78%) | 5.01 (91%) | 5.61 (102%) | ial
AIR CONDITIONING SYSTEM WITH BUILT-IN INTERMEDIATE HEAT EXCHANGER WITH TWO DIFFERENT TYPES OF REFRIGERANTS CIRCULATED This application is a Continuation of application Ser. No. 08/400,879, filed Mar. 8, 1995, now abandoned.

BACKGROUND OF THE INVENTION

1. Technical Field

The present invention relates to an air conditioning system, and it particularly relates to the air conditioning system which utilizes alternative refrigerant that substitutes HCFC22 (hydrochlorofluorocardons) refrigerant that possibly destroys ozone layer.

2. Background Art

Due to an implication in the destruction of the stratospheric ozone layer, chlorine-containing refrigerants such as chlorofluorocarbons (CFCs) and hydrochlorofluorocarbons (HCFCs) are scheduled for phase-out. Thus, the HCFC22 utilized in current air conditioning systems need be replaced by hydrofluorocarbons (HFCs), natural refrigerant and the like.

When these alternative refrigerants are utilized in the conventional air conditioning systems, a theoretical COP of refrigerant HFC134a is greater than that of HCFC22, where the COP stands for coefficient of performance which is determined by thermal property. However, since a pressure loss in a connecting pipe that connects an indoor unit and an outdoor unit of the system is rather large, the COP of the system of the actual use is significantly deteriorated compared to that of HCFC22. Moreover, ammonia and propane can produce as much COP as HCFC22. However, the ammonia is poisonous while the propane is flammable, so that the usage thereof is difficult at ordinary home.

On the other hand, the refrigerant HFC32/125(50/50) which is mixed by 50% and 50% of HFC32 and HFC125 by weight, respectively, and the refrigerant $CO_2$ present smaller pressure losses in the connecting pipes, compared to HCFC22. However, the theoretical COP thereof is much smaller than that of HCFC22, so that the actual COP in the entire air conditioning system is far below that of HCFC22.

As described above, so-called alternative refrigerants that substitute the conventionally used HCFC22 in the air conditioning system do not quite present enough actual COP compared to the HCFC22. As for other refrigerants whose actual COP would be enough, they are not so desirable because of being poisonous or flammable, so that those are not perfectly satisfactory as alternative refrigerants, either.

SUMMARY OF THE INVENTION

In view of the foregoing drawbacks, it is therefore an object of the present invention to provide an air conditioning system in which each alternative refrigerant can be fully utilized so as to present as much as actual COP in comparison with the conventional HCFC22 and to achieve safe use as operating refrigerants.

To achieve the object, there is provided a air conditioning system comprising: a first refrigerant circuit in which a first refrigerant circulates, the first refrigerant circuit including: an indoor heat exchanger; and a fluid drive means, connected to the indoor heat exchanger by way of a first piping, for driving the first refrigerant; a second refrigerant circuit in which a second refrigerant circulates, the second refrigerant circuit including: a compressor means for compressing the second refrigerant; an expansion means, connected to the compression means, for expanding the second refrigerant; and an outdoor heat exchanger connected to the compressor means and the expansion means by way of a second piping; and an intermediate means for heat-exchanging between the first refrigerant in the first refrigerant circuit and the second refrigerant in the second refrigerant circuit, wherein the system is characterized in that a pressure loss of the first refrigerant in the first piping is smaller than a predetermined value, while a theoretical coefficient of performance (COP) of the second refrigerant determined by a thermal property thereof is greater than a predetermined value.

One advantage of the present invention is that the fluid drive mechanism serving as liquid pump can be operated very efficiently, since in both cooling and heating operations, the refrigerant in the indoor passage side enters into a fluid drive mechanism as liquid, therefore, the fluid drive mechanism serving as liquid pump can be operated very efficiently.

BRIEF DESCRIPTION OF THE DRAWINGS

These and other objects, features and advantages of the present invention will become more apparent from the following description of the preferred embodiment taken in conjunction with the accompanying drawings, in which.

DETAILED DESCRIPTION OF THE PREFERRED EMBODIMENTS

Features of the present invention will become apparent in the course of the following description of exemplary embodiments which are given for illustration of the invention and are not intended to be limiting thereof. Embodiments of the present invention will now be described with reference to the drawings.

BASIC CONFIGURATION

Let us describe hereinafter the basic novel concept and structure for air conditioning system to realize the objective of the present invention followed by some typical variations.

Figure 1:
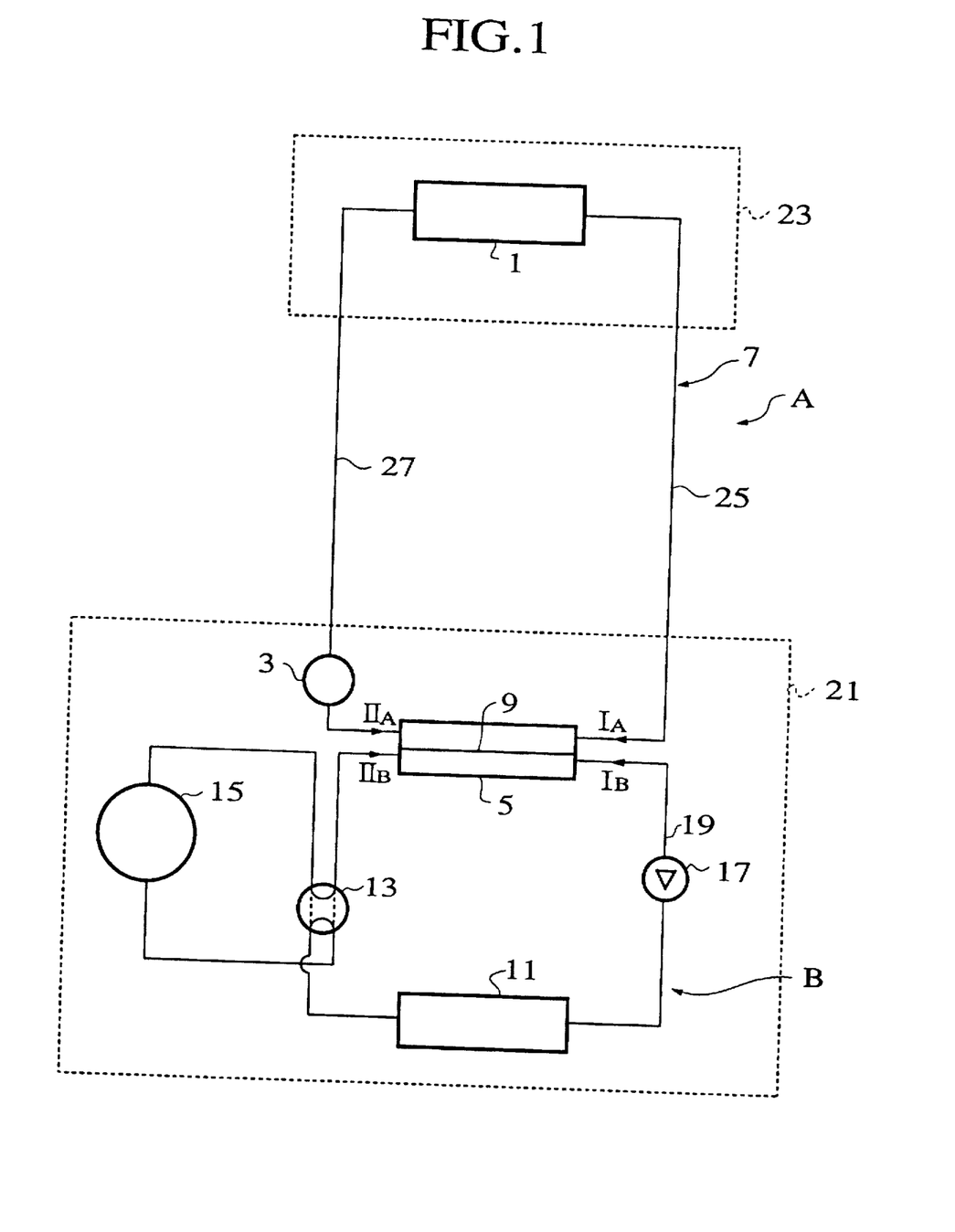
FIG. 1 is a refrigerant circuit diagram showing the basic configuration of the air conditioning system according to the present invention.

FIG. 1 is a refrigerant circuit diagram showing the basic configuration of the air conditioning system according to the present invention.

Referring to FIG. 1, this novel circuit is characterized in that there are provided two closed passage comprised of passage A serving as the first refrigerant circuit and passage B serving as the second refrigerant circuit.

In the passage A, there are provided indoor heat exchanger 1; fluid drive mechanism 3 connected to the indoor heat exchanger 1; intermediate heat exchanger 5; and pipeline 7 which connects the intermediate heat exchanger 5 and the indoor heat exchanger 1. In the passage A, there is used HFC32/125(50/50) as refrigerant a which circulates through the passage A. In the indoor heat exchanger 1, the refrigerant a and indoor air are heat-exchanged. The fluid drive mechanism 3 may be a reversible pump such that discharge direction of the refrigerant a can be switched to either an indoor heat exchanger side or an intermediate heat exchanger side. In the intermediate heat exchanger 5, a passage for the refrigerant a and another passage for the refrigerant b are partitioned by partition wall 9, so that the refrigerant a and the refrigerant b are heat-exchanged by way of the partition wall 9.

In the passage B, there are provided outdoor heat exchanger 11; 4-way valve 13; compressor 15; the intermediate heat exchanger 5, expansion valve 17; and pipeline 19 connected to the expansion valve 17. In the passage B, there is preferably used HFC134a as refrigerant b which circulates through the passage B. In the outdoor heat exchanger 11, the refrigerant b and the outdoor air are heat-exchanged. The 4-way valve 13 can be switched to either states as illustrated by solid line or dotted line. The compressor 15 blows out the refrigerant b as high-temperature and high-pressure gaseous refrigerant, and the expansion valve 17 expands the refrigerant b.

Provided within outdoor unit 21 are all elements in the passage B, the intermediate heat-exchanger 5 and the fluid drive mechanism 3, whereas the indoor heat-exchanger 1 is provided within indoor unit 23. The pipeline 7 in the passage A includes a connecting pipe 25 which connects the outdoor unit 21 and the indoor unit 23.

Next, operation for the air conditioning system thus configured will be described hereinbelow.

Referring to FIG. 1, in cooling operation, the refrigerant a in the passage A flows in the direction $I_A$, and the refrigerant b flows in the direction $I_B$. Then, the refrigerant a discharged as a state of liquid from the fluid drive mechanism 3 enters into the indoor heat exchanger 1 by way of the connecting pipe 27. Thereafter, in the indoor heat exchanger 1, the air is cooled thereby, so that part of or all of refrigerant a is evaporated. The refrigerant a which is in the either states of vapor or gas-liquid two-phase, flows to the intermediate heat exchanger 5 through the connecting pipe 25. In the intermediate heat exchanger 5, the refrigerant a is cooled by the refrigerant b which is in the low-temperature in the passage B side, and is returned as liquid to the fluid drive mechanism 3.

On the other hand, in the cooling operation, vapor-state refrigerant b which is compressed and discharged from the compressor 15 flows to the outdoor heat exchanger 11 by way of the 4-way valve 13 whose passage is in the state illustrated as dotted line. In the outdoor heat exchanger, the refrigerant b is cooled by the air, so that part of or all of the refrigerant b is condensed, in other words, the refrigerant b gives off heat to the outside air. Thereafter, the refrigerant b which became either liquid state or gas-liquid two-phase state is expanded by way of the expansion valve 17, and becomes gas-liquid two-phase so as to flow to the intermediate heat exchanger 5. As described above, in this intermediate heat exchanger 5, the refrigerant b cools the refrigerant a so as to become vapor. Thereafter, the refrigerant b that became vapor returns to the compressor 15 through the 4-way valve 13.

Referring to FIG. 1, in heating operation, the refrigerant a in the passage A flows in the direction $II_A$, and the refrigerant b flows in the direction $II_B$. Then, the refrigerant a discharged as liquid from the fluid drive mechanism 3 enters into the intermediate heat exchanger 5, and is heated by the refrigerant b which is in the high-temperature state in the passage B side, so that part of or all of the refrigerant a is evaporated. The refrigerant a which is in the either states of vapor or gas-liquid two-phase, flows to the indoor heat exchanger 5 through the connecting pipe 25. In the indoor heat exchanger 1, the refrigerant a is condensed by heating the air. Thereafter, the refrigerant a which became the state of liquid returns to the fluid drive mechanism 3 by way of the connecting pipe 27. As described above, in both cooling and heating operations, the refrigerant a enters into the fluid drive mechanism 3 as liquid, therefore, the fluid drive mechanism serving as liquid pump can be operated very efficiently.

On the other hand, in the heating operation, vapor-state refrigerant b which is compressed and discharged from the compressor 15 flows to the intermediate heat exchanger 5 by way of the 4-way valve 13 whose passage is in the state illustrated as solid line. In the intermediate heat exchanger 5, the refrigerant b heats up the refrigerant a so that part of or all of the refrigerant b is condensed. Thereafter, the refrigerant b which became either liquid state or gas-liquid two-phase state is expanded by way of the expansion valve 17, and becomes gas-liquid two-phase so as to flow to the outdoor heat exchanger 11. In the outdoor heat exchanger 11, the refrigerant b is heated by the air so as to become vapor. Thereafter, the refrigerant b that became vapor returns to the compressor 15 through the 4-way valve 13.

In the passage A, the refrigerant a is circulated by the fluid drive mechanism 3 so that the heat is transported from the indoor heat exchanger 1 to the intermediate exchanger 5, so as to perform the cooling operation; or it is transported from the intermediate heat exchanger 5 into the indoor heat exchanger 1, so as to perform the heating operation. It is to be noted that the smaller becomes the pressure loss of the refrigerant in piping from exit to entrance of the fluid drive mechanism 3 in the passage A, the smaller an input to the fluid drive mechanism in the passage A becomes. In particular, the reduction of the pressure loss is very effective for the pipeline 7 in the passage A includes long connecting pipes 25, 27 which connect the outdoor unit 21 and the indoor unit 23.

Figure 7:
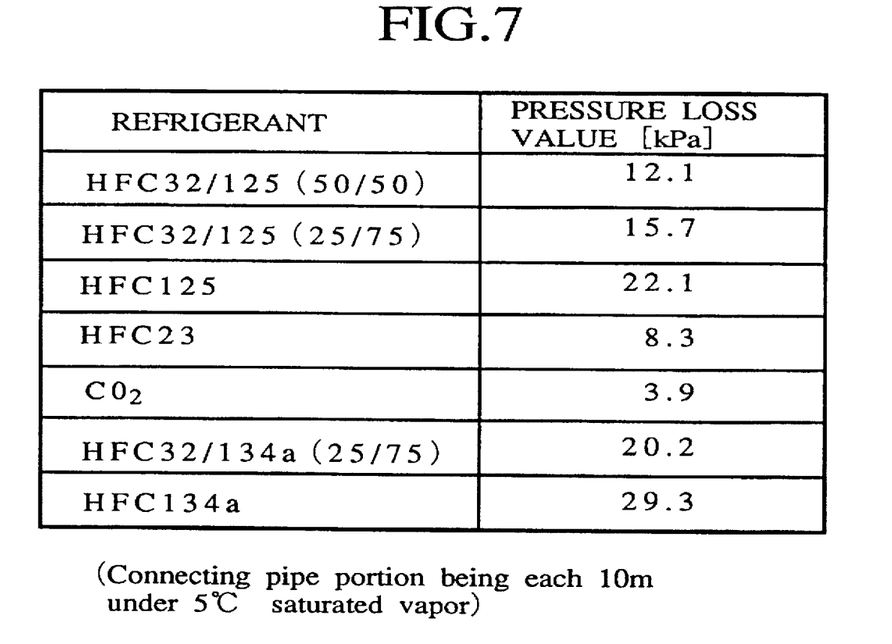
FIG. 7 is a table showing pressure losses of each HFC refrigerant and natural refrigerant.

FIG. 7 is a table showing pressure losses of each HFC refrigerant and natural refrigerant.

Referring to FIG. 7, the pressure loss of HFC32/125(50/50) serving as the refrigerant a used in the passage A, is 12.1 [kPa]. Now, the pressure loss of HFC134a serving as the refrigerant b used in the passage B, is 29.3 [kPa]. Thus, the pressure loss of HFC32/125(50/50) is much smaller than that of HFC134a. Therefore, when HFC32/125(50/50) is used as the refrigerant a, the input to the fluid drive mechanism 3 is greatly reduced, compared to a case where HFC 134a is used as the refrigerant a.

Moreover, referring to FIG. 7, the pressure loss of HFC23 is 8.3 [kPa] which indicates an extremely low value, so that the input to the fluid drive mechanism 3 can be further reduced if HFC23 is used as the refrigerant a in the passage A.

On the other hand, since the passage B is provided in and enclosed by the outdoor unit 21, the length of the piping 19 is rather short. As a result thereof, the effect of the pressure loss on the actual COP in the passage B is significantly small compared to the conventional air conditioning system. Therefore, even if the refrigerant having great theoretical COP is selected without particularly considering the pressure loss, the overall actual COP thereof in the passage B will become high.

Figure 8:
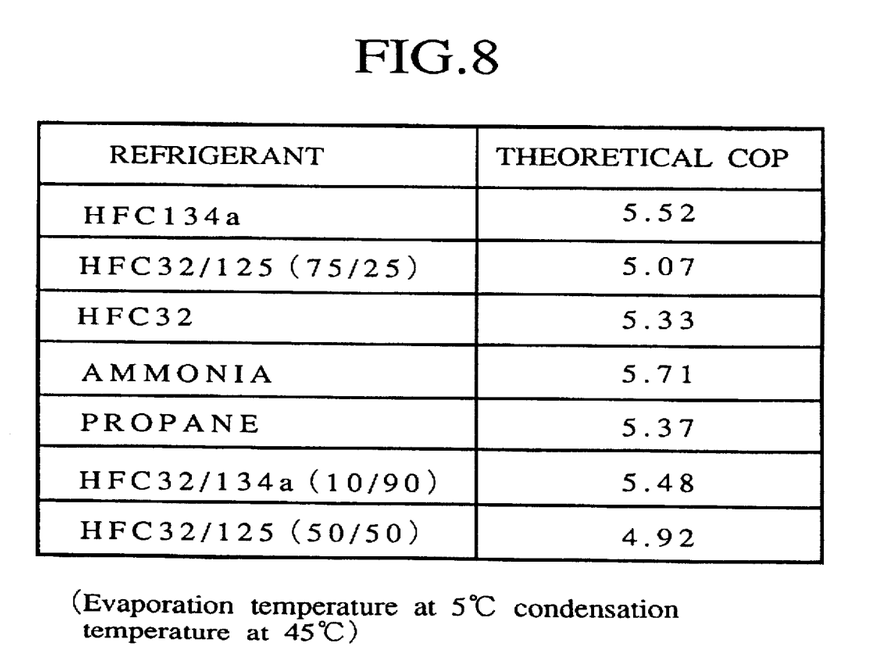
FIG. 8 is a table showing comparison of theoretical COP values of HFC refrigerant and natural refrigerant.

FIG. 8 is a table showing comparison of theoretical COP values of HFC refrigerant and natural refrigerant.

Referring to FIG. 8, the theoretical COP for HFC134a is 5.52. The theoretical COP for HFC32/125(50/50) is 4.92. Therefore, the theoretical COP for HFC134a is significantly greater than that for HFC32/125(50/50). Thus, when HFC134a is used as the refrigerant b in the passage B, the actual COP of the passage B will improve significantly, compared to a case where HFC32/125(50/50) is used.

As described so far, in the above example for the basic configuration according to the present invention, the refrigerant passage of the air conditioning system is comprised of passage A and passage B, and as the refrigerant a flowing in the passage A there is used HFC32/125(50/50) whose pressure loss is much smaller than that of HFC134a, while as the refrigerant b flowing in the passage B there is used HFC134a whose theoretical COP value is much greater than that of HFC32/125(50/50). Thereby, in the system according to the basic configurational example shown above, there is obtained high actual COP value which is greater than the case where HFC134a and HFC32/125(50/50) are used each alone in the conventional practice. In other words, in the novel configuration of the air conditioning system equipped with an intermediate heat exchanging system which can handle two different refrigerants, each advantage in two types of the refrigerants can be utilized so as to achieve optimal operation.

Moreover, as for $CO_2$, HFC32/125(25/75) in which the weight ratio of HFC32 is less than 50% against HFC125 and as for HFC32/134a(25/75) in which the weight ratio of HFC32 is 10-25%, each pressure loss thereof is less than that of HFC134a in the piping portion. If these are used as refrigerant a, the substantially same effect can be obtained as in the above basic configuration. Moreover, as for other refrigerants not listed so far, such refrigerants can bring out the same effect as in the refrigerant a as long as the pressure loss in the piping portion is less than that of HFC134a. In addition, an upper limit value of the weight ratio of HFC32 for HFC32/125, HFC32/134a and the like is determined by a flammability limit of mixed refrigerant. Therefore, even though it is currently set to 50% and 25% for HFC32/125 and HFC32/134a, respectively, it may be increased in the future. If so, a newly set limit of the flammability will then be the upper limit value of HFC32, according to the present invention.

As for ammonia, propane, HFC32, HFC32/125 whose weight ratio of HFC32 is more than 50%, and HFC32/134a whose weight ratio is less than 25%, depicted in table 2, each theoretical COP therefor is greater than that of HFC32/125 (50/50), therefore, by utilizing these refrigerants b, there can be obtained the same effects as in the above embodiment, though there may exist slight difference in its effective degree. Moreover, other refrigerants can bring out the same effects with the present invention, as refrigerant b, as long as the theoretical COP is greater than that of HFC32/125(50/50).

Figure 9:
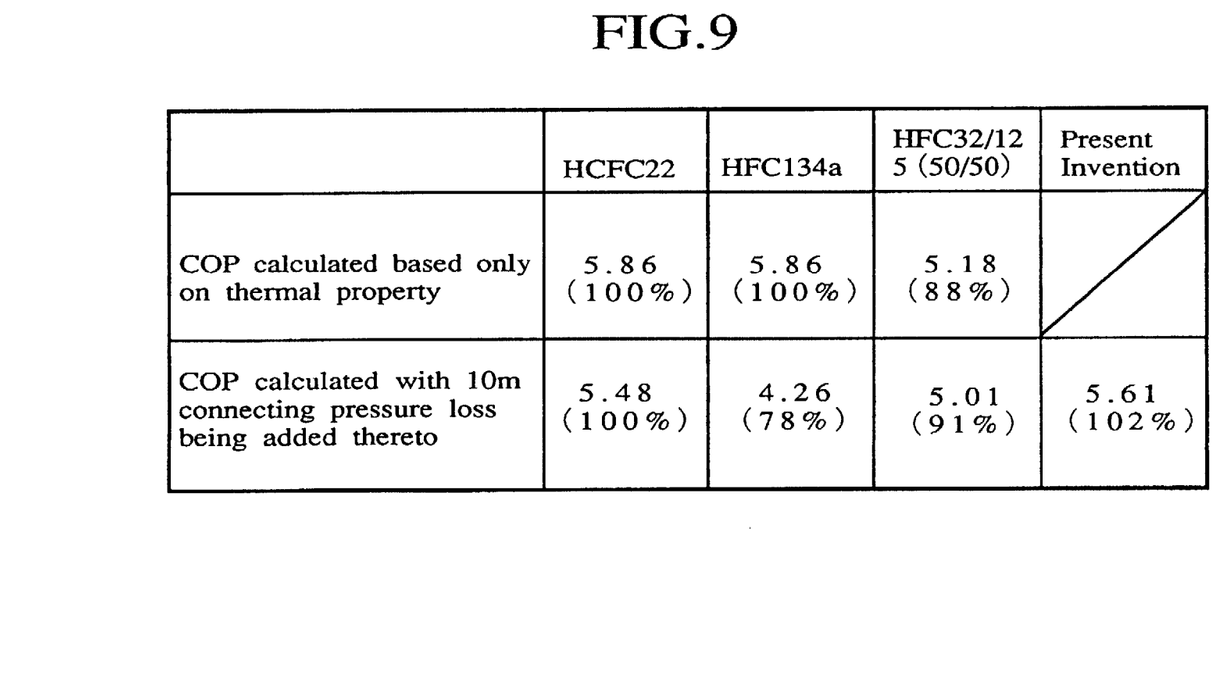
FIG. 9 is a table showing values of COP during operation of the air conditioning system according to the basic configuration of the present invention.

In order to clarify the unexpectedly significant effect obtained by the example according to the novel configuration, FIG. 9 shows values of COP during operation of the air conditioning system.

As for HFC134a which is a promising refrigerant as alternative refrigerant substituting the HCFC22, the COP value thereof calculated based solely on the thermal property is 5.86 which is same with that of HCFC22. However, the pressure loss of the HFC134a is rather great. Thus, the COP adding the pressure loss in the 10 m-long connecting pipe is 4.26 which is merely 78% of that of HCFC22 under the same condition (5.48) (see FIG. 9).

On the other hand, as for HFC32/125(50/50), the COP thereof calculated based solely on the thermal property is 5.18 which is 88% of that of HCFC22 and rather low. However, the pressure loss thereof is comparatively small compared to that of HFC134a. Thus, the COP adding the pressure loss in the 10 m-long connecting pipe is 5.01. This shows that the reduced amount of COP by adding the pressure loss thereto is small with HFC32/125(50/50), compared to HFC134a against HCFC22. Nevertheless, the COP of HFC32/125(50/50) is only 91% of that of HCFC22 under the same condition.

Now, according to the novel configuration according to the present invention, the advantageous feature of HFC134 having high theoretical COP and feature of HFC32/125(50/50) having minimal pressure loss are both utilized simultaneously by means of intermediate heat exchanging means such as one illustrated as the intermediate heat exchanger 5 in FIG. 1. Therefore, the COP value for the system according to the above basic configuration presents 5.61 which is obtained by considering the loss due to temperature change for 1° C. in the intermediate heat exchanger 5. This COP value of 5.61 is significantly higher than that of HFC134a or HFC32/125(50/50). Moreover, the highest COP 5.61 is the improved COP by 2% against that of HCFC22. This fact shows that the present invention is novel and unexpectedly superior to the conventional practice.

It shall be appreciated that the pressure of the first refrigerant is preferably constantly higher than that of the second refrigerant. It shall also be appreciated that the first refrigerant may be $CO_2$ with pressure of approximately 2648 kPa at temperature of approximately 10° C., while the second refrigerant may be propane with pressure of approximately 2582 kPa at temperature of approximately 70° C., so that the $CO_2$ can be moved to a propane side even in the event of leakage caused in the intermediate heata exchanger.

In the following description, let us implement other variations for the above basic configuration.

FIRST EMBODIMENT

Figure 2:
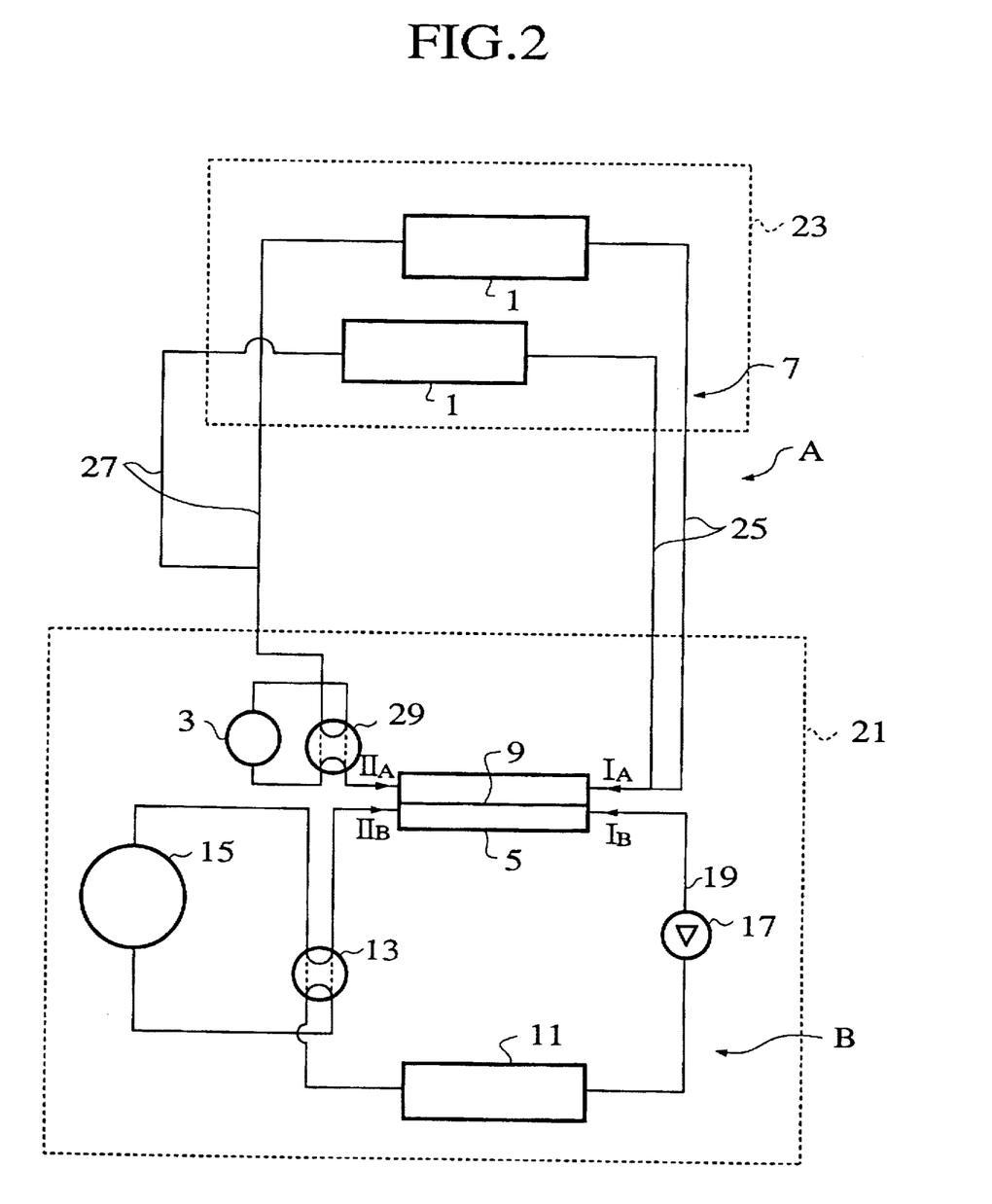
FIG. 2 is a refrigerant circuit diagram according to the first embodiment based on the basic configuration of the present invention shown in FIG. 1.

FIG. 2 is a refrigerant circuit diagram according to the first embodiment based on the basic configuration of the present invention described above. In this first embodiment shown in FIG. 2, the same reference numerals are used for the same elements depicted in the basic configuration shown in FIG. 1. The difference or modified portions compared to the basic configuration shown in FIG. 1 are as follows:

(1) The fluid drive mechanism 3 is a pump that drives the fluid in one direction; in the passage A there is provided 4-way valve 29 which switches the passages for the fluid discharged from the fluid drive mechanism 3 in either states illustrated by solid line or dotted line (FIG. 2).

(2) There are provided two indoor heat exchangers 1, 1; the connecting pipes 25, 25, 27, 27 which connect the indoor unit 23 and the outdoor unit 21 correspond to the two indoor heat exchangers 1, 1; the connecting pipe is branched out to two ducts so as to form a multiple-system air conditioning system.

(3) There is used ammonia as the refrigerant b flowing in the passage B.

The operation of passage B in the air conditioning system configured as above gives same advantageous effects as in the basic configuration shown in FIG. 1.

In the passage A, the refrigerant a flows in direction denoted by $I_A$ (FIG. 2) in the cooling operation. The refrigerant a discharged as liquid from the fluid drive mechanism 3 is branched out to two connecting pipes 27, 27 by way of 4-way valve 29 switched to the state illustrated as solid line, so as to flow respectively to the two indoor heat exchangers 1, 1. Thereafter,the air is cooled thereby, so that part of or all of refrigerant a is evaporated. The refrigerant a which is in the either states of vapor or gas-liquid two-phase, joins together after passing through the connecting pipes 25, 25, and flows to the intermediate heat exchanger 5. In the intermediate heat exchanger 5, the refrigerant a is cooled and condensed by the refrigerant b which flows in the direction $I_B$ and is of low-temperature in the passage B. Then, the refrigerant a which became liquid is returned to the fluid drive mechanism 3 by way of the 4-way valve 29.

In the heating operation, the passage of 4-way valve 29 is switched to the state illustrated as dotted line so that the refrigerant a flows in direction $II_A$. The liquid-state refrigerant a discharged from the fluid drive mechanism 3 flows to the intermediate heat exchanger 5 by way of the 4-way valve 29, and is heated by the refrigerant b which flows in the direction $II_B$ and is of high-temperature in the passage B, so that part of or all of the refrigerant a is evaporated. The refrigerant a which is in either states of vapor or gas-liquid two-phase, is branched out to the two connecting pipes 25, 25, and flows to the indoor heat exchanger 1, 1. In the indoor heat exchanger 1, the air is heated, so that the refrigerant a is condensed. The refrigerant a which was in the state of liquid by being condensed joins together after passing through the connecting pipes 27, 27 and is returned to the fluid drive mechanism 3 by way of the 4-way valve 29.

As described above, in both cooling and heating operations, the refrigerant a enters into the fluid drive mechanism 3 as liquid, therefore, the fluid drive mechanism serving as liquid pump can be operated very efficiently.

In this first embodiment, as the refrigerant a in the passage A there is used HFC32/125(50/50) whose pressure loss is small and is also used in the basic operational example above. As the refrigerant b in the passage B, there is used ammonia whose theoretical COP is greater than that of HFC32/125(50/50), so that the same advantageous effects can be obtained as in the basic configuration described before. The advantageous effects obtained by this first embodiment will be significant in the multiple-system air conditioning system which is equipped with two or more indoor heat exchangers, especially the multi-system air conditioner for use with a commercial building in which the piping connecting the indoor unit and the outdoor unit is rather long.

Moreover, even though in this first embodiment the ammonia is used, as the refrigerant b which is poisonous, the passage B where the refrigerant b circulates is set up in the outdoor unit 21, so that danger in the event of leakage thereof may be decreased. Moreover, the outdoor unit is often set up in the rooftop, so that the danger degree can be further decreased.

Now, in the air conditioning systems, part of lubricant used in the compressor is discharged, together with refrigerant, into the passage, therefore, a performance in terms of returnability thereof is greatly responsible for reliability of the compressor. Thus, in this first embodiment, the compressor 15 is provided in the passage B only. As a result thereof, the lubricant circulates only within the passage B that bears shorter overall distance than in passage A, so that the returnability of the lubricant is improved so as to result in improvement of the reliability. In particular, this advantageous effect thereby is significant in the air conditioning system whose length of connecting pipe is rather long such as in the multi-system air conditioners.

SECOND EMBODIMENT

Figure 3:
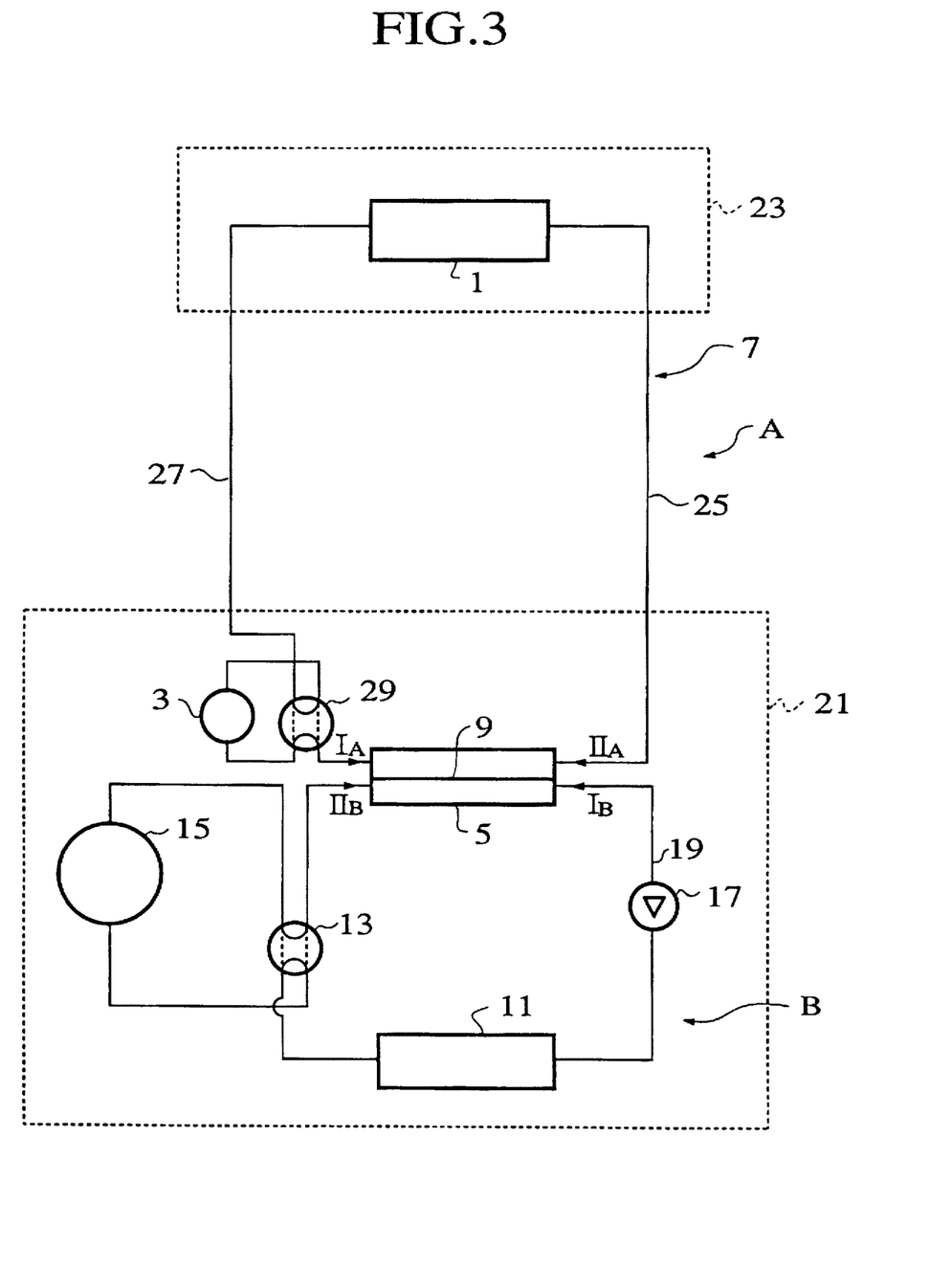
FIG. 3 is a refrigerant circuit diagram according to the second embodiment.

FIG. 3 is a refrigerant circuit diagram according to the second embodiment based on the basic configuration of the present invention described above. In this second embodiment shown in FIG. 3, the same reference numerals are used for the same elements depicted in the basic configuration shown in FIG. 1. The difference or modified portions compared to the basic configuration shown in FIG. 1 are as follows:

(1) The fluid drive mechanism 3 serves as the compressor, there is provided 4-way valve 29 that switches the passage of fluid discharged from the fluid drive mechanism 3 to either states indicated by the solid line or dotted line (FIG. 3).

(2) As the refrigerant a there is utilized HFC32/134a(25/75), and as the refrigerant b there is utilized HFC32/134a(10/90), both of which are nonazeotropic refrigerant mixtures (NARMs).

(3) There are provided passages in which the refrigerants a and b flow in opposite directions in each passage (complete coutercurrent flow.

The operation of passage B in the air conditioning system configured as above gives same advantageous effects as in the basic configuration shown in FIG. 1.

In the passage A, the refrigerant a flows in direction denoted by $I_A$ (FIG. 3) in the cooling operation. The refrigerant a discharged as vapor from the fluid drive mechanism 3 flows to the intermediate heat exchanger 5 by way of 4-way valve 29 switched to the state illustrated as dotted line. In the intermediate heat exchanger 5, the refrigerant a is cooled by the refrigerant b which flows in the direction $I_B$ in the passage B that counterflows to the refrigerant a, so that part of or all of the refrigerant a is condensed. The refrigerant a which became liquid or gas-liquid two-phase flows to the indoor heat exchanger 1 by way of the connecting pipe 25, and then it is evaporated by cooling the air. After passing through the connecting pipe 27, the refrigerant a which became vapor is returned to the fluid drive mechanism 3 by way of the 4-way valve 29.

In the heating operation, the passage of 4-way valve 29 is switched to the state illustrated as solid line so that the refrigerant a flows in direction $II_A$. The vapor-state refrigerant a discharged from the fluid drive mechanism 3 flows to the indoor heat exchanger 1 by way of the 4-way valve 29 and the connecting pipe 27. In the indoor heat exchanger 1, the refrigerant a heats up the air, so that part of or all of refrigerant a is condensed. The refrigerant a which became in either states of liquid or gas-liquid two-phase, flows to the intermediate heat exchanger 5 through the connecting pipe 25, so that the refrigerant a is heated by the refrigerant b that flows in the direction $II_B$ in the passage B and that flows in the countercurrent direction to the refrigerant a, and then is evaporated. Thereafter, the refrigerant a which became vapor is returned to the fluid drive mechanism 3 by way of the 4-way valve 29.

As described above, in both cooling and heating operations, the refrigerant a enters into the fluid drive mechanism 3 as vapor, therefore, the fluid drive mechanism serving as a compressor can be operated very efficiently.

In this second embodiment, as the refrigerant a in the passage A there is used HFC32/134a(25/75) whose pressure loss is small that that of HFC134a. As the refrigerant b in the passage B, there is used HFC32/134a(10/90) whose theoretical COP is greater than that of HFC32/125(50/50), so that the same advantageous effects can be obtained as in the basic configuration described before.

Moreover, because both the refrigerants a and b being nonazeotropic mixture refrigerant are chosen in this second embodiment, there occurs a temperature gradient during phase change. On the other hand, in both the cooling and heating operations, the refrigerants a and b form the countercurrent flow to each other in the intermediate heat exchanger 5. As a result thereof, even though there occurs the temperature gradient during the phase change, a highly efficient heat exchange can be realized between the refrigerants a and b in the intermediate heat exchanger 5.

Moreover, when the nonazeotropic mixture refrigerants are utilized as refrigerants a and b in the previous embodiments, it may be configured such that the complete countercurrent flow is formed therebetween in the intermediate heat exchanger 5, as in this second embodiment.

THIRD EMBODIMENT

Figure 4:
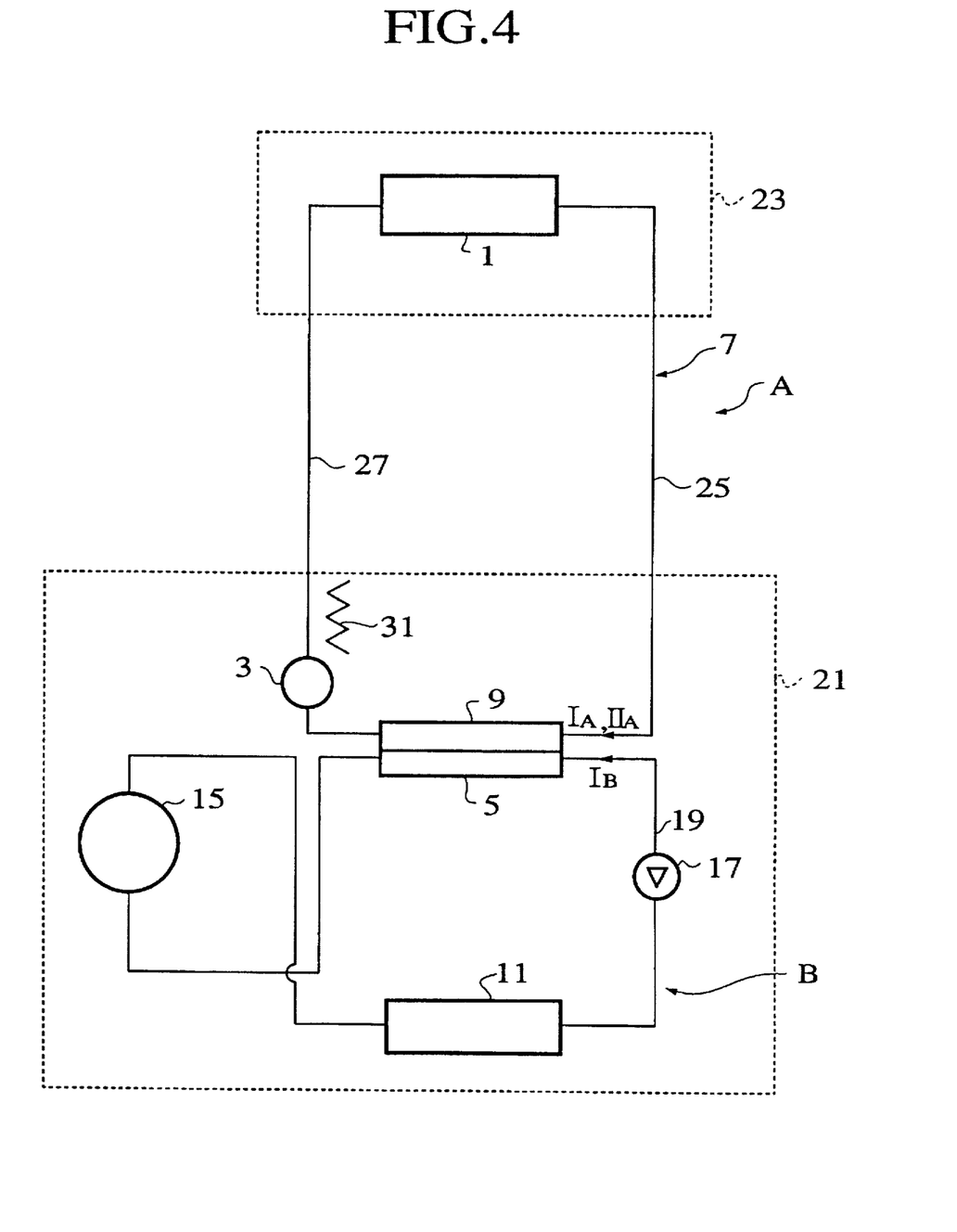
FIG. 4 is a refrigerant circuit diagram according to the third embodiment.

FIG. 4 is a refrigerant circuit diagram according to the third embodiment based on the basic configuration of the present invention described above. In this third embodiment shown in FIG. 4, the same reference numerals are used for the same elements depicted in the basic configuration shown in FIG. 1. The difference or modified portions compared to the basic configuration shown in FIG. 1 are as follows:

(1) The fluid drive mechanism is a gas pump which drives the fluid in only one direction.

(2) Refrigerant heating unit 31 is provided in the passage A. The refrigerant heating unit 31 is a combustor that heats up the refrigerant a by utilizing city gas, propane, kerosene and the like as fuel.(3)

(3) There is not provided the 4-way valve in the passage B.

(4) $CO_2$ is used as the refrigerant a, and the propane is used as the refrigerant b.

The operational aspects in the cooling operation in the passage A and passage B are same with those depicted in the basic configurational example; in the cooling operation, the refrigerant heating unit 31 in the passage A will be set to stoppage state.

On the other hand, in the heating operation, the compressor 15 in the passage B is in the stoppage state, so that the refrigerant b is not circulated in the passage B then. In other words, the passage A alone is activated during the heating operation. The $CO_2$ serving as the refrigerant a in the passage A becomes a super critical state (i.e. a state in which the pressure becomes greater than a critical pressure) at temperature greater than 32° C., and the refrigerant a as being gaseous is circulated in the passage A in the direction $II_A$ which is the same direction of $I_A$ in the cooling operation. The refrigerant discharged from the fluid drive mechanism 3 serving as the gas pump is heated by the refrigerant heating unit 31 so as to become approximately 100° C. Thus high-temperature refrigerant a flow to the indoor heat exchanger 1 by way of the connecting pipe 27. In the indoor heat exchanger 1, the refrigerant a heats up the air so as to become 20° C. or lower in temperature. The low-temperature refrigerant a is returned to the fluid drive mechanism 3 by way of the connecting pipe 25 and the intermediate heat exchanger 5. Since the refrigerant b in the passage B is being stopped, the intermediate heat exchanger 5 does not operate as the heat exchanger.

In the above-described air conditioning system according to the third embodiment, as the refrigerant a there is used $CO_2$ whose pressure loss in the piping portion is smaller than that of HFC134a, and as the refrigerant b there is used the propane whose theoretical COP is greater than that of HFC32/125(50/50). Therefore, the same advantageous effects can be obtained in the cooling operation that activates both the passage A and passage B, as in the basic configuration.

On the other hand, in the heating operation, only the refrigerant a is circulated, so that the heat from the refrigerant heating unit 31 is transferred to the air by way of the indoor heat exchanger 1. In a case where the refrigerant heating unit is provided in the conventional air conditioning system, the refrigerant which presents high COP and is flammable can not be used in view of possible leakage in the refrigerant unit. As a result, improvement of COP in the cooling operation can not be expected. However, in this third embodiment, as the refrigerant b there can be safely utilized the propane, HFC32 and the like which present high COP and are highly flammable, so that the COP in the cooling operation can be improved.

Moreover, in this third embodiment, as the refrigerant a there can be used a refrigerant such as HFC125 whose phase changes during the heating operation, without providing the 4-way valve serving as a unidirectionally rotatable pump. In that case, liquid-state refrigerant a is discharged from the fluid drive mechanism 3 and is heated by the refrigerant heating unit 31, so that part of or all of the refrigerant a is evaporated. Thereafter, the refrigerant a that became either states of vapor or gas-liquid two-phase, flows to the indoor heat exchanger 1 by way of connecting pipe 27. In the indoor heat exchanger 1, the air is heated, so that the refrigerant a is condensed. The refrigerant a which then became liquid, flows, as being unchangedly liquid, to the fluid drive mechanism by way of the connecting pipe 25 and the intermediate heat exchanger 5 which is then not operating as the heat exchanger.

FOURTH EMBODIMENT

Figure 5:
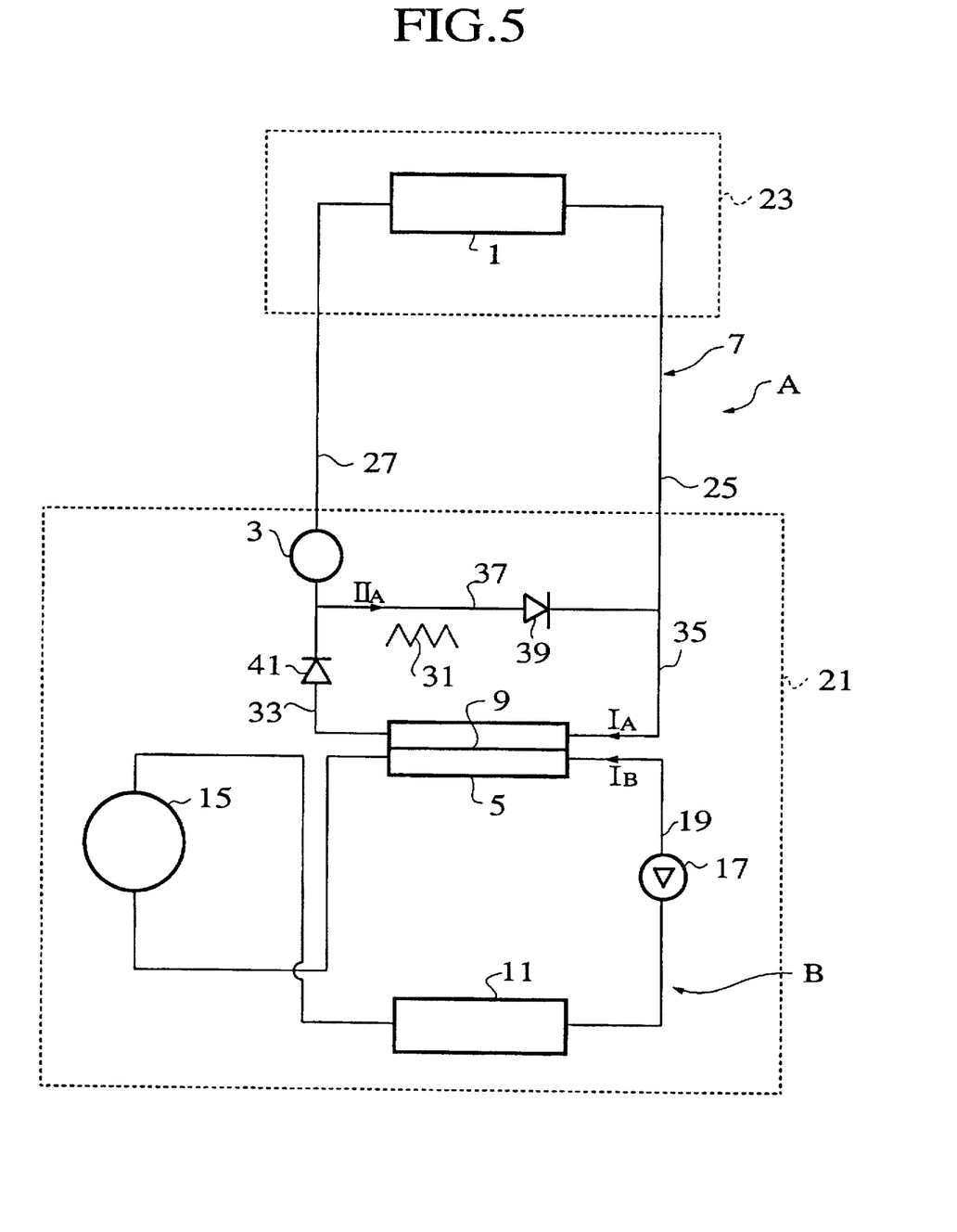
FIG. 5 is a refrigerant circuit diagram according to the fourth embodiment.

FIG. 5 is a refrigerant circuit diagram according to the fourth embodiment based on the basic configuration of the present invention described above. In this fourth embodiment shown in FIG. 5, the same reference numerals are used for the same elements depicted in the basic configuration shown in FIG. 1. The difference or modified portions compared to the basic configuration shown in FIG. 1 are as follows:

(1) There is additionally provided a bypass passage 37 which connects the pipeline 33 which couples the fluid drive mechanism 3 and the intermediate heat exchanger 5, and the pipeline 35 provided within the outdoor unit 21 coupling the intermediate heat exchanger 5 and the connecting pipe 25. Moreover, in the bypass passage 37 there is provided a check valve 39 which only allows the flow directed from the pipeline 33 side to the pipeline 35 side, and there is also provided a check valve 41 which only allows the flow directed from the intermediate heat exchanger 5 toward the fluid drive mechanism 3.

(2) In the bypass passage 37 there is provided a refrigerant heating unit 31 in the pipeline 33 side (between a connecting point of pipeline 33 and the check valve 39). The refrigerant heating unit 31 is a combustor that heats the refrigerant by utilizing the city gas, propane, kerosene and the line as fuel.

(3) The 4-way valve is not provided in the passage B.

(4) HFC32/125(25/75) is used as the refrigerant a; HFC32/125(75/25) is used as refrigerant b.

The operation of the passage B in the cooling operation is the same with the basic operation shown in FIG. 1. In the heating operation, the compressor 1 is stopped so that circulation of refrigerant b is not effected as in the third embodiment shown in FIG.. 4.

In the passage A, the refrigerant a during the cooling operation flow in direction $I_A$. Then, the refrigerant a which is discharged from the fluid drive mechanism 3 and flowed to the connecting pipe 25 by way of the indoor heat exchanger 1, does not enter to the bypass passage 37, and, instead, flows to the intermediate heat exchanger 5 thanks to the check valve 39. Therefore, the operation of the passage A during the cooling operation is same to the basic configuration.

On the other hand, in the heating operation, the fluid drive mechanism 3 serving as a reversible pump is rotated in the direction opposite to that under the cooling operation. Thereby, the refrigerant a discharged from the fluid drive mechanism 3 flows to the pipeline 33 side, but does not flow to the intermediate heat exchanger 5 thanks to the check valve 41, and instead, flows through the bypass passage 37 denoted by $II_A$. The refrigerant heating unit 31 is activated during this heating operation, so that part of or all of refrigerant a is evaporated. The refrigerant a which became either states of vapor or gas-liquid two-phase, flows to the indoor heat exchanger 1. In the indoor heat exchanger 1, the refrigerant a heats up the air so as to become liquid, and the liquid-state refrigerant a flows to the fluid drive mechanism 3 by way of the connecting pipe 27.

The check valves 39 and 41 are operated such that the refrigerant a is introduced to the intermediate heat exchanger 5 in the cooling operation, whereas the refrigerant a is directed to the bypass passage 37 in the heating operation, respectively. In other words, there is constituted a control valve which controls the refrigerant a to flow either to the intermediate heat exchanger 5 or the bypass passage 37.

In this fourth embodiment, as the refrigerant a there is utilized HFC32/125(25/75) whose pressure loss in the piping portion is smaller than that of HFC134a; as the refrigerant b there is utilized HFC32/125(75/25) whose theoretical COP is greater than that of HFC32/125(50/50), so that the same advantageous effects as in the basic configuration can be obtained.

Moreover, in the heating operation, the heating operation is caused by the refrigerant heating, and the refrigerant a is bypassed over the intermediate exchanger 5. Thereby, the heat obtained by the refrigerant heating unit 31 can be effectively transported to the indoor heat exchanger 1, so that comfortable and highly efficient heating operation can be realized.

Moreover, in this fourth embodiment, as the refrigerant a heated by the refrigerant heating unit 31 there is utilized HFC32/125(25/75) whose flammability is extremely low, whereas as the refrigerant b there is used HFC32/125(75/25) whose COP is high enough. Therefore, the COP need not be sacrificed at the time of cooling operation, and realized is a safely operated air conditioning system of an refrigerant heating type.

FIFTH EMBODIMENT

Figure 6:
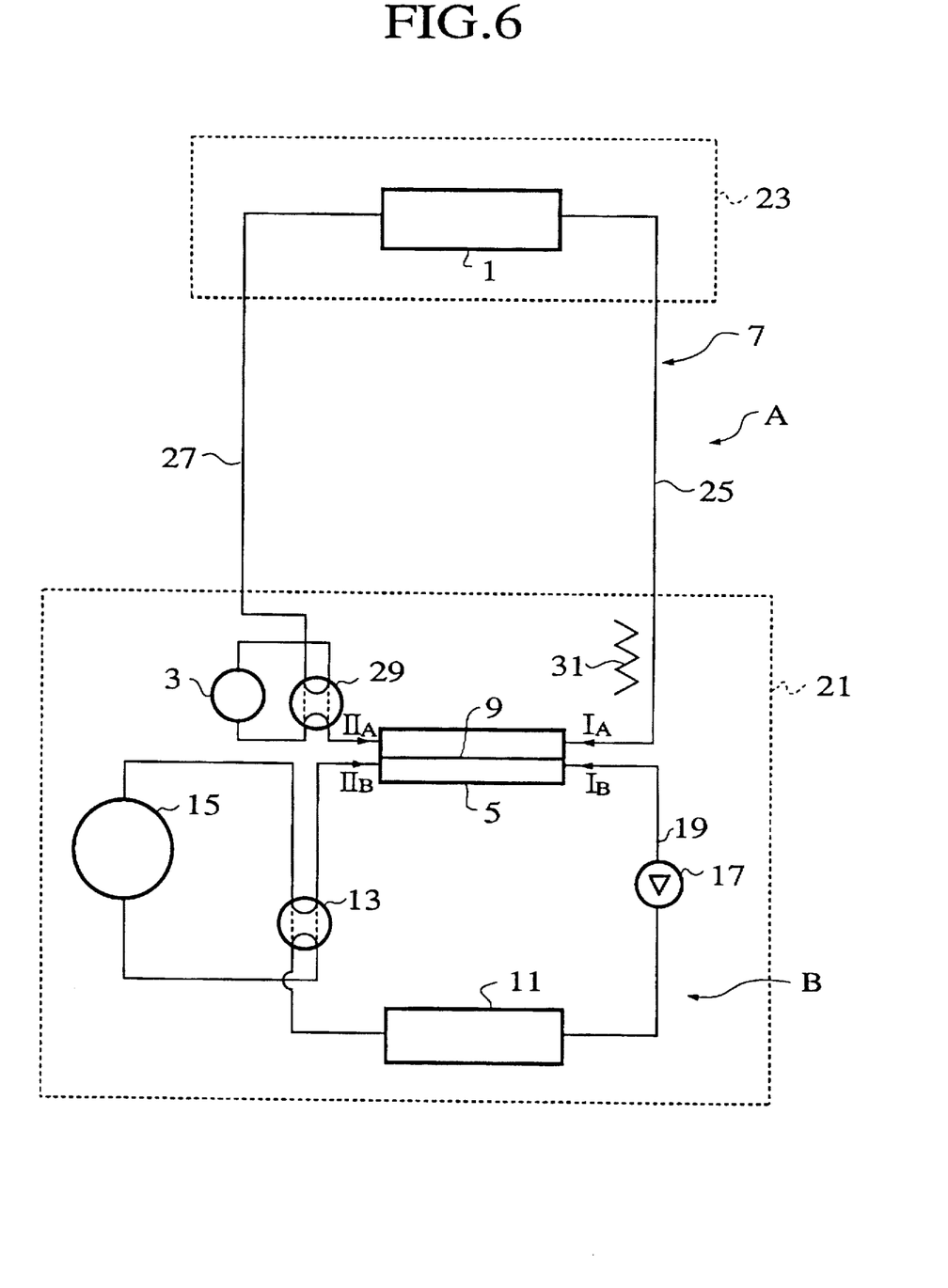
FIG. 6 is a refrigerant circuit diagram according to the fifth embodiment.

FIG. 6 is a refrigerant circuit diagram according to the fifth embodiment based on the basic configuration of the present invention described above. In this fifth embodiment shown in FIG. 6, the same reference numerals are used for the same elements depicted in the basic configuration shown in FIG. 1. The difference or modified portions compared to the basic configuration shown in FIG. 1 are as follows:

(1) The fluid drive mechanism 3 is preferably a pump that discharges the fluid in unidirection, and in the passage A there is provided a 4-way valve 29 which switches the fluid passage discharged from the fluid drive mechanism 3 in either states illustrated by solid line or dotted line in FIG. 6.

(2) There is provided a refrigerant heating unit 31 in the pipeline 25 within the outdoor unit 21 in the passage A. The refrigerant heating unit 31 is a combustor that heats up the refrigerant a by utilizing the city gas, propane, kerosene and the like as fuel.

(3) As the refrigerant a there is used HFC125, while HFC32 is used as the refrigerant b.

The operational aspects in the passage B are same as in the basic configuration shown in FIG. 1.

In the passage A, the refrigerant a flows in the direction $I_A$ during the cooling operation. The refrigerant a discharged as liquid from the fluid drive mechanism 3 flows to the indoor heat exchanger 1 by way of the 4-way valve presenting the solid-line state (FIG. 6) and further by way of the connecting pipe 27. In the indoor heat exchanger 1, the refrigerant a cools the air, so that part of or all of the refrigerant a is evaporated. The refrigerant a which became either states of being vapor or gas-liquid two-phase, flows to the intermediate heat exchanger 5 after passing through the connecting pipe 25. In the intermediate heat exchanger 5, the refrigerant a is cooled and condensed by the refrigerant b which flows in the direction $I_B$ in the passage B. The liquid-state refrigerant a is returned to the fluid drive mechanism 3 by way of the 4-way valve 29.

At the time of heating operation, the 4-way valve 29 is switched to the state indicated by the dotted line in FIG. 6, so that the refrigerant a flows in the direction indicated by $II_A$ (FIG. 6). The refrigerant a which is discharged, as liquid, from the fluid drive mechanism 3, flows to the intermediate exchanger 5 by way of the 4-way valve 29, so that the refrigerant a is heated by the refrigerant b which flows in direction $II_B$ in the passage B, and part of or all of the refrigerant a is evaporated.

Then, when the refrigerant a becomes vapor-state or two-phase having high qualities, i.e. when a heating load is low, the refrigerant heating unit 31 is not activated.. Then, the refrigerant a discharged from the intermediate heat exchanger 5, flows to the indoor heat exchanger 1 by way of the connecting pipe 125. In the indoor heat exchanger 1, the refrigerant a heats up the air and is condensed. The refrigerant a which became liquid is returned to the fluid drive mechanism 3 by way of the 4-way valve 29, after passing through the connecting pipe 27.

When the heating load is large in such cases where the temperature for outside air is relatively low or indoor temperature is comparatively low at the time of start, the refrigerant a discharged from the intermediate heat exchanger 5 becomes gas-liquid two-phase having low quality, if the system is operated under the condition where the input of the compressor 15 is not large enough. In that case, the refrigerant heating unit 31 is activated to heat up the refrigerant a, so that all of or almost all of the refrigerant a is evaporated. Thereby, the refrigerant a which became vapor or gas-liquid two-phase having high qualities, flows to the indoor heat exchanger 1 by way of the connecting pipe 25. In the indoor heat exchanger 1, the refrigerant a heats up the air so as to be condensed. After passing through the connecting pipe 27, the refrigerant a which became liquid flows to the fluid drive mechanism 3 by way of 4-way valve 29.

Activation or nonactivation of the refrigerant heating unit 31 is determined, for example, by correlation between the room temperature where the indoor unit 23 is provided, and the set-up temperature of the indoor unit. In other words, the refrigerant heating unit 31 is activated when the room temperature is lower than the set-up temperature by more than a predetermined value, whereas the refrigerant heating unit 31 is not activated if otherwise.

In the air conditioning system according to the above fifth embodiment, as the refrigerant a there is used HFC125 whose pressure loss in the piping portion is smaller than that of HFC134a, and as the refrigerant b there is HFC32 whose theoretical COP is greater than that of HFC32/125(50/50), so that the same advantageous effects can be obtained as in the basic configuration. Moreover, in the event of the heating operation where the heating load is relatively large, the heat from the refrigerant heating unit 31 is added to the heat from the refrigerant b in the passage B. As a result thereof, the input to the compressor 15 in the passage B is not increased, so that high heating capacity can be obtained thereby.

Moreover, in the conventional air conditioning system, flammable refrigerants can not be used in view of the possible leakage in the refrigerant heating unit. Therefore, in the conventional air conditioning system, it is difficult to improve the COP under cooling operation. On the other hand, in this embodiment, as the refrigerant b the flammable refrigerant such as HFC 32 and propane can be used as in the third embodiment, so that the COP in the cooling operation can be improved.

It shall be appreciated that other auxiliary elements may be implemented to the major elements described in the air conditioning systems according to the above mentioned embodiments. As auxiliary elements there may be implemented a refrigerant tank which controls the amount of the refrigerant circulating in the passage A, a pressure controlling mechanism which controls an evaporating or condensing temperature, a gas-liquid separator which prevents the vapor from flowing to the pump, an accumulator which prevents the liquid from flowing to the compressor and so on. Moreover, the auxiliary elements may include other controller units and sensors. Moreover, the auxiliary elements may further include the conventionally available accumulator, refrigerant tank, various valves, controller-sensor and -units in the passage B and the like.

It is to be noted the combination and connectedness between each fluid drive mechanism and the refrigerant a, refrigerant b, the number of the indoor heat exchangers and whether or not the refrigerant heating unit is implemented are not limited to the specific combination and number described in the above basic configuration and five embodiments. Examples of other possible combination may be a multi-system air conditioning apparatus which are equipped with a compressor serving as the fluid drive mechanism and a plurality of indoor heat exchangers. Or as the refrigerant b there is used HFC 134a, and the refrigerant heating unit may be employed.

In summary, according to the present invention, the first refrigerant whose pressure loss is small is utilized in the first refrigerant circuit including the fluid drive mechanism and the indoor heat exchanger, and the second refrigerant whose theoretical COP determined by the thermal property is high is utilized in the second refrigerant including the compressor, outdoor heat exchanger and expansion mechanism. The present invention is further characterized by that there is provided the novel intermediate heat exchanger in both first and second refrigerant circuits so as to perform heat-exchanging between the first refrigerant and the second refrigerant. Therefore, only the merits of each of first and second refrigerants are utilized in the entire refrigerant cycle of the air conditioning system, so that a safe and highly efficient operation is realized thereby.

Besides those already mentioned above, many modifications and variations of the above embodiments may be made without departing from the novel and advantageous features of the present invention. Accordingly, all such modifications and variations are intended to be included within the scope of the appended claims.

What is claimed is:

1. A split-type air conditioning system comprising:
   a first refrigerant circuit in which a first refrigerant circulates, the first refrigerant circuit including
      an indoor heat exchanger and
      fluid drive means, connected to the indoor heat exchanger by way of a first piping, for driving the first refrigerant;
   a second refrigerant circuit in which a second refrigerant circulates, the second refrigerant circuit including
      compressor means for compressing the second refrigerant,
      expansion means, connected to the compressor means, for expanding the second refrigerant, and
      an outdoor heat exchanger connected to the compressor means and the expansion means by way of a second piping; and
   intermediate means provided in an outdoor location for heat-exchanging between the first refrigerant in the first refrigerant circuit and the second refrigerant in the second refrigerant circuit;
   wherein the pressure loss of the first refrigerant in the first piping per unit length is smaller than the pressure loss of the second refrigerant, while the theoretical coefficient of performance (COP) of the second refrigerant determined by a thermal property thereof is greater than the theoretical coefficient of performance (COP) of the first refrigerant determined by a thermal property thereof.

2. The system of claim 1, wherein the fluid drive means includes a reversible pump so that a blowout side and a suction side thereof are reversibly operable.

3. The system of claim 1, further comprising: a first valve, provided in the first refrigerant circuit, which is able to switch the direction of fluid discharged from the fluid drive means either to an indoor heat-exchanger side or an intermediate-means side.

4. The system of claim 1, wherein the fluid drive means includes a compressor.

5. The system of claim 1, further comprising: a means, provided in the first refrigerant circuit, for heating the first refrigerant.

6. The system of claim 1, wherein the first refrigerant further includes a bypass passage which bypasses the intermediate means; a means, provided in the the bypass passage, for heating the first refrigerant; and a valve means for controlling that the first refrigerant flows either to the bypass passage or the intermediate means.

7. The system of claim 1, wherein the first refrigerant includes mixed refrigerant of HFC32 and HFC125 so that a weight ratio of HFC32 is equal or less than 50 percent of HFC125.

8. The system of claim 1, wherein the first refrigerant includes HFC125.

9. The system of claim 1, wherein the first refrigerant includes $CO_2$.

10. The system of claim 1, wherein the first refrigerant includes mixed refrigerant containing HFC23.

11. The system of claim 1, wherein the first refrigerant includes HFC23.

12. The system of claim 1, wherein the second refrigerant includes HFC134a.

13. The system of claim 1, wherein the second refrigerant includes ammonia.

14. The system of claim 1, wherein the second refrigerant includes a hydro-carbon refrigerant.

15. The system of claim 1, wherein the second refrigerant includes a mixed refrigerant of HFC32 and HFC125 so that a weight ratio of HFC32 is equal or greater than 50 percent over HFC125.

16. The system of claim 1, wherein both the first and second refrigerants include a mixed refrigerant of HFC32 and HFC134a so that a mixture composition ratio of the first refrigerant differs from that of the second refrigerant.

17. The system of claim 1, wherein there are provided two or more indoor heat exchangers connected in parallel.

18. The system of claim 1, wherein the intermediate means includes a partition wall so as to define and separate between a first refrigerant passage and a second refrigerant passage therein, and wherein the first refrigerant flowing in the first refrigerant passage flows in opposite direction to the second refrigerant flowing in the second refrigerant passage.

19. The system of claim 1, wherein the pressure of the first refrigerant is constantly higher than that of the second refrigerant.

20. The system of claim 19, the first refrigerant is $CO_2$ with pressure of approximately 2648 kPa at temperature of approximately $-10°$ C., while the second refrigerant is propane with pressure of approximately 2582 kPa at temperature of approximately 70° C., so that the $CO_2$ can be moved to a propane side even in the event of leakage caused in the intermediate means.

* * * * *